United States Patent
Knittel et al.

(10) Patent No.: US 7,800,321 B2
(45) Date of Patent: Sep. 21, 2010

(54) METHOD FOR THE DETECTION OF THE ROTATIONAL POSITION OF THE ROTOR OF A DC MOTOR WITH COMMUTATOR

(75) Inventors: Otto Knittel, Soest (DE); Michael Kriener, Salzkotten (DE)

(73) Assignee: Behr-Hella Thermocontrol GmbH, Stuttgart (DE)

( * ) Notice: Subject to any disclaimer, the term of this patent is extended or adjusted under 35 U.S.C. 154(b) by 394 days.

(21) Appl. No.: 11/857,025

(22) Filed: Sep. 18, 2007

(65) Prior Publication Data

US 2008/0079380 A1 Apr. 3, 2008

(30) Foreign Application Priority Data

Sep. 20, 2006 (DE) .................. 10 2006 044 070

(51) Int. Cl.
*H02K 27/00* (2006.01)
*H02P 1/24* (2006.01)
*H02P 3/18* (2006.01)
*H02P 25/10* (2006.01)

(52) U.S. Cl. .................. 318/244; 318/245; 388/803

(58) Field of Classification Search .................. 318/244, 318/245; 388/803
See application file for complete search history.

(56) References Cited

U.S. PATENT DOCUMENTS

| 5,203,499 A | 4/1993 | Knittel |
| 5,898,288 A | 4/1999 | Rice et al. |
| 6,144,179 A | 11/2000 | Kessler et al. |
| 6,768,282 B2 * | 7/2004 | Lutter et al. ................. 318/603 |
| 6,845,337 B2 * | 1/2005 | Gerlach ....................... 702/145 |
| 7,064,509 B1 * | 6/2006 | Fu et al. ................. 318/400.23 |
| 2004/0263104 A1 * | 12/2004 | Iwanaga et al. ............. 318/439 |

FOREIGN PATENT DOCUMENTS

| DE | 40 17 779 A1 | 12/1991 |
| DE | 42 17 265 C2 | 12/1993 |
| DE | 42 22 914 A1 | 1/1994 |
| DE | 195 11 307 C1 | 1/1997 |
| DE | 197 29 238 C1 | 8/1998 |
| EP | 0 424 831 B1 | 5/1991 |
| EP | 0 459 435 B1 | 12/1991 |

* cited by examiner

*Primary Examiner*—Bentsu Ro
*Assistant Examiner*—Erick Glass
(74) *Attorney, Agent, or Firm*—Shumaker & Sieffert, P.A.

(57) ABSTRACT

In a method for the detection of the rotational position of the rotor of a DC motor with commutator by evaluating the time development of a rotor current signal of the DC motor, said signal comprising a periodic waviness around an average value and comprising current ripples generated by commutation which are superimposed to said waviness, the rotor current signal of a current ripple detector unit (30) is supplied for detecting the current ripples of the rotor current signal. The rotor current signal is further supplied to a waviness detector unit (34) for detecting a half or full wave of the rotor current signal. The current ripple detector unit (30) is arranged to output a current ripple pulse for each detected current ripple. The waviness detector unit (34) is arranged to output a waviness pulse for each period of the waviness. The output signals of both detector units (30,34) are supplied to a logic OR unit (38) for generating a logic signal. Within a period of the rotor current signal, at least one of the detector units (30,34) will output a pulse. Thereby, the logic signal comprises a logic pulse for each period of the rotor current signal.

8 Claims, 1 Drawing Sheet

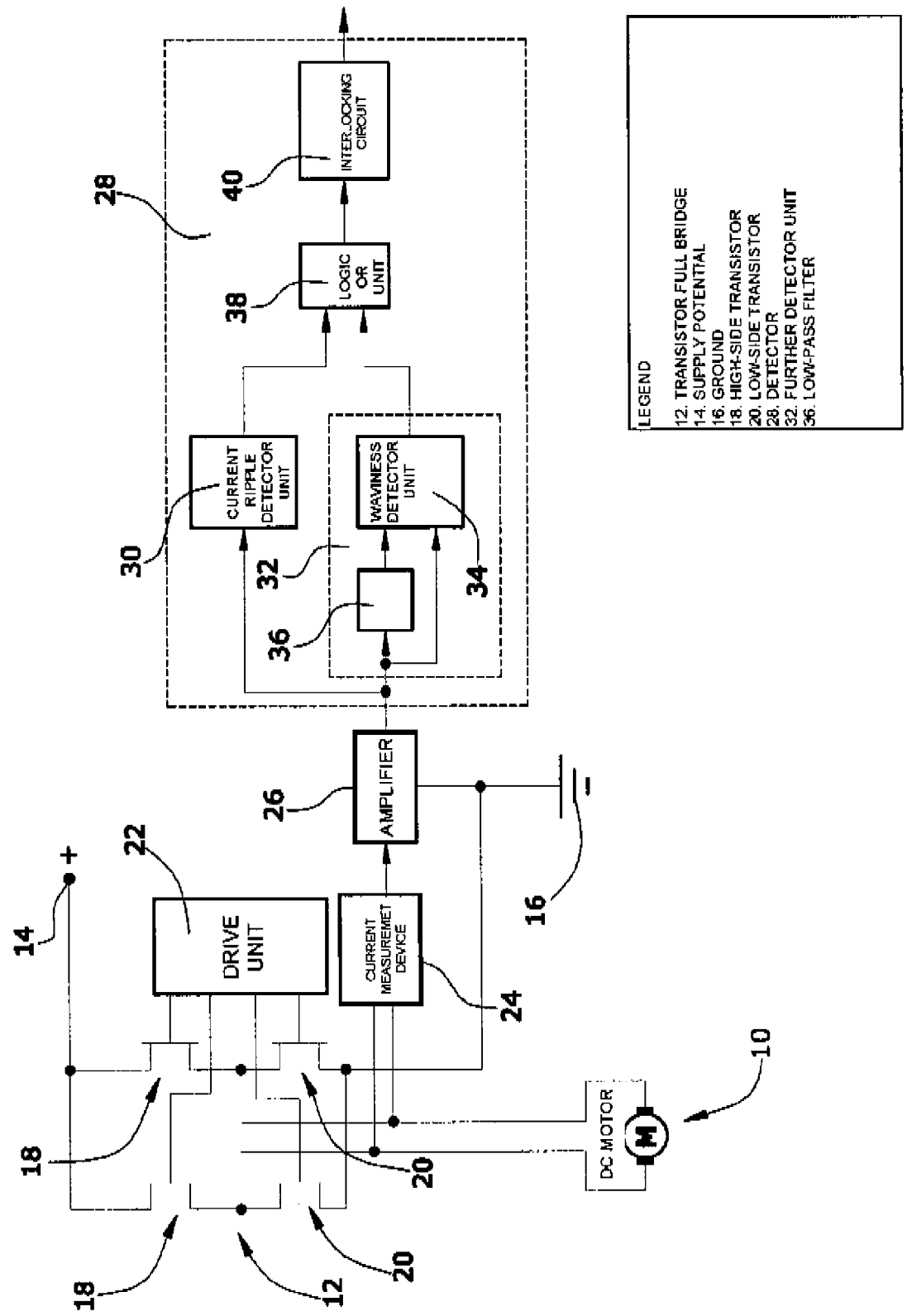

METHOD FOR THE DETECTION OF THE ROTATIONAL POSITION OF THE ROTOR OF A DC MOTOR WITH COMMUTATOR

RELATED FOREIGN APPLICATION

The present application claims the priority of German Patent Application DE 10 2006 044 070.6, the disclosure of which is herewith incorporated herein by reference.

BACKGROUND OF THE INVENTION

The present invention relates to a method for the detection of the rotational position of the rotor of a DC motor with commutator by evaluating the time development of a rotor current signal of the DC motor, which signal comprises a periodic waviness around an average value, and current ripples generated by commutation which are superimposed to said waviness. Such a method can be applied e.g. in actuating systems in order to detect, without using a sensor, the present moving position of an actuator driven by the DC motor. The method is particularly useful in automobiles, notably for automatic window lifts, electrically adjustable seats, a throttle valve in the internal combustion engine, as well as mixing valves and air-distribution valves, respectively, of the heating or air-conditioning system of the automobile.

It is known that the time development of the rotor current of a DC motor with commutator includes current peaks (hereinafter called current ripples) which can be attributed to a brief short-circuiting between two collector lamellae by the brushes of the DC motor. From DE 40 17 779 A1, DE 42 17 265 C2, DE 42 22 914 A1, DE 195 11 307 C1, EP 0 424 831 B1 and EP 0 459 435 B1, it is known that these current ripples can be counted in order to detect the rotational position of the rotor of the DC motor or the moving position of an actuator driven by the DC motor.

Further, it is known to examine the rotor current signal of a commutator DC motor on the basis of the waviness so as to be able to conclude to the rotational position or the number of rotations of the rotor. Thus, for instance, U.S. Pat. No. 5,898,288 describes the detection of the waviness of a rotor current signal but does exactly not describe the detection of current ripples.

In the above printed publication, reference is made to current ripples (see e.g. column 5, lines 30 to 33); however, what is illustrated in the drawings of said publication and what is really meant, after all, is the evaluation of the waviness of the rotor current signal. The waviness of the rotor current signal, however, is only one characteristic of a DC motor with commutator. Thus, superimposed to the wave-shaped rotor current signal are the current ripples which are formed as short "current peaks". Exactly these current ripples, however, are not shown in U.S. Pat. No. 5,898,288. The fact that the waviness of the rotor current signal of a DC motor with commutator usually is wrongly equated with the "ripples" of the motor current, is further evident from DE-C-197 29 238. In this context, reference is to be made e.g. to the last sentence of the abstract of the cover sheet of this printed publication. The publication itself deals with the calculation of the point of time when a ripple (a half-wave) is to be expected in the rotor current signal. A half-wave, however, is clearly not a current ripple.

In known ripple count methods, a problem resides in the existence of load conditions and idle conditions of the DC current motor during which the detection of the current ripple is not performed with sufficient reliability. Further, depending on the respective use of a DC motor with commutator (DC motor with asymmetrical or symmetrical motor), it may happen that individual ripples are generated which, if they were included in the counting, would cause a faulty result.

It is an object of the invention to provide a method for the detection of the rotational position of the rotor of a DC motor with commutator by evaluating the time development of the rotor current signal of the DC motor, by which method the rotational position of the rotor and optionally, on the basis thereof, the current setting position of an actuator driven by the DC motor can be determined with still higher precision and reliability.

SUMMARY OF THE INVENTION

According to the present invention, to achieve the above object, there is proposed a method for the detection of the rotational position of the rotor of a DC motor with commutator wherein the time development of a rotor current signal of the DC motor, which signal comprises a periodic waviness around an average value, and current ripples generated by commutation which are superimposed to said waviness, is evaluated, the rotor current signal of a current ripple detector unit is supplied for detecting the current ripples of the rotor current signal, the rotor current signal is further supplied to a waviness detector unit for detecting a half or full wave of the rotor current signal, for each detected current ripple, a current ripple pulse is output by the current ripple detector unit, for each period of the waviness, a waviness pulse is output by the waviness detector unit, and the output signals of both of said detector units are supplied to a logic OR unit for generating a logic signal, within a period of the rotor current signal, a pulse is output by at least one of said detector units whereby said logic signal comprises a logic pulse for each period of the rotor current signal.

In a general sense, according to the invention, there is examined a second criterion so as to be able to safely detect that the motor or the rotor of the motor has rotated by an angular amount at which a current ripple should have been detected. Thereby, it is also possible to increment the counter for the current ripples although, due to the specific prevailing operational condition of the motor, no current ripple has been detected. Further, the invention makes it possible to suppress the counting of per se not-to-be expected current ripples which may happen to be generated, depending on the prevailing load and operational conditions of the DC motor.

The invention makes use of the recognition that the rotor current signal of a DC motor due to the magnetic reversal has a certain (basic) waviness, i.e. periodically oscillates in a substantially sinusoidal manner about an average value. Superimposed to this sinusoidal wave are the current ripples generated by the commutation. For each period of the waviness of the rotor current signal, one current ripple exists.

According to the invention, there is alternatively detected either the current ripple or a period so as to generate a count pulse. The number of count pulses will then be used for detecting the position of the rotor of the DC motor in dependence on the polarity and the groove configuration, respectively, of the DC motor.

Thus, according to the invention, the rotor current signal is supplied to two detector units, notably to a current ripple detector unit and a waviness detector unit. In each detector unit, a respective count pulse is emitted for each detected result (current ripple or waviness detection). The output signals of both detector units are subjected to a logic OR operation whereby a logic signal is generated. According to the invention, the logic signal comprises one logic pulse for each period of the rotor current signal if within a period of the rotor current signal the output signal of at least one of the detector units comprises a count pulse.

Thus, in the method of the invention, the rotor current signal is examined in two regards in order to output a count pulse for each period of the signal. By examining the rotor current signal for its waviness on the one hand and for the existence of the current ripples superimposed to the waviness on the other hand, what is accomplished is an overall detection of the rotor current signal which in all operating conditions of the DC motor will reliably result in count pulses which are representative for the position of the rotor. During an acceleration or braking of the DC motor, the current ripples in the rotor current signal are easily detectable because the signal/noise ratio is correspondingly good. In case of loaded or idling operation, an asymmetric motor may generate additional current ripples which are incorrectly detected, and a symmetric motor may generate relatively small current ripples which are detectable only with difficulties. During these two operational conditions of an asymmetric or symmetric motor, the waviness detection is of good use because in all of these operational conditions the rotor current signal will have a relatively distinct waviness.

The inventive method can be used e.g. for detecting the position of an element movable by the DC motor in that, on the basis of the rotation of the rotor and the known interrelation between the extent of the rotation of the rotor and the extent of the movement of the element, the current movement position of the element is detected. Particularly, the inventive method can be used for regulating the temperature in the passenger cabin of a vehicle wherein the position of an actuator driven by the DC motor is detected by said method, with the actuator influencing the amount of heat to be supplied to the interior of the vehicle or the distribution of the amount of this heat supply.

According to an advantageous variant of the invention, it is provided that, after a logic pulse has been generated in the logic signal, the next logic pulse will be generated only when, after a lapse of time of e.g. half the period of waviness of the rotor current signal, the output signal of at least one of the detector units includes a pulse. In this variant of the invention, the generating of a logic signal is suppressed for half the period of the rotor current signal. In this manner, it is reliably prevented that, erroneously, two pulses per period of the rotor current signal are generated in the logic signal or that pulses are included in the count which have been erroneously generated, e.g. due to disturbances of the rotor current signal.

The pulses of the waviness detector unit are generated on the basis of the amplitude of the rotor current signal. If the rotor current signal exceeds a presettable minimum amplitude, a waviness pulse is generated which will be terminated e.g. when the amplitude again drops below the presettable value. The next waviness pulse will be generated only the next time that the amplitude exceeds the presettable value.

According to an advantageous embodiment of the invention, it is further provided that the rotor current signal is subjected to a low-pass filtration for detecting the average value of the rotor current signal about which the rotor current signal is oscillating in a sinusoidal manner.

The detection of current ripples can be performed in different ways. Thus, for instance, it can be conceived to make use of level detection. A certain disadvantage of level detection resides in that the current ripples have different amounts, depending on the load condition or the operating condition of the DC motor. If the potential current ripple amounts are known, use can be made of a level detection for detecting the current ripples. As a threshold value, one would have to preset e.g. a value which is smaller than the smallest current ripple to be expected in all operational conditions of the DC motor, or the threshold value could be subjected to a tracking process corresponding to the development of the rotor current.

As an alternative to level detection, also flank detection can be of use for detecting the current ripples. In this case, a ripple pulse will be generated in the current ripple detector unit if a presettable minimum slope with a presettable minimum amplitude is detected in the development of the rotor current signal.

According to a further advantageous variant of the invention, the DC motor is driven by a full bridge with two high-side transistors and two low-side transistors, wherein the rotor current signal is obtained by measuring the switch-on resistance of the low-side transistor which has the rotor current flowing therethrough depending on the rotational direction of the rotor. Thus, the switch-on resistances of the two low-side transistors can be obtained by measurement technology. For examining the development of the rotor current signal, there will be used in each case that low-side transistor through which the current is presently flowing, which is dependent on the rotational direction of the rotor. The advantage of using the low-side transistors for examining the development of the rotor current signal resides in that the examination of the development of the rotor current signal of the motor will then be possible also during the braking phase of the motor. This is because, in the braking phase, both of the low-side transistors have current flowing therethrough (short-circuit of the DC motor relative to the ground). Thus, detection of the rotor current via the full bridge is possible both during the accelerating and during the braking, which is required for reliable detection of the rotor of the DC motor in all operating conditions (acceleration, braking, continued rotation of the motor with and without load.

The implementation of the method according to the invention under the aspect of circuit technology will be explained in greater detail hereunder with reference to the sole FIGURE of the drawings.

BRIEF DESCRIPTION OF DRAWINGS

FIG. 1 is a schematic illustration of an embodiment of the invention.

DETAILED DESCRIPTION OF A PREFERRED EMBODIMENT OF THE INVENTION

As schematically illustrated in the drawing, a DC motor 10 with commutation, in which motor the development of the rotor current signal is to be examined, is driven by a transistor full bridge 12. This transistor full bridge 12 is connected between a supply potential 14 and the ground 16 and comprises two high-side transistors 18 and two low-side transistors 20. All of the transistors 18,20 are driven by a drive unit 22. The DC motor 10 which is to be examined is arranged in the bridge branch of transistor full bridge 12. The rotor current of DC motor 10 is picked up for measurement by a current measurement device 24 so that the development of the rotor current signal can be observed through measurement technology. In the present embodiment, the current measurement is performed by resistance measurement of the $R_{SD-ON}$ resistance of the respective current-carrying low-side transistor 20.

The output signal of the current measurement device 24 is amplified in an amplifier 26 and supplied to a detector 28. Detector 28 comprises a current ripple detector unit 30 and a further detector unit 32. Ripple detector unit 30 is operative to detect, in a manner known per se, the current ripples in the development of the rotor current signal, which is carried out e.g. by flank or level detection. Said further detector unit 32 includes a waviness detector unit 34 arranged to receive the output signal of amplifier 26, i.e. the rotor current signal, and the rotor current signal low-pass-filtered by means of a low-pass filter 36. The output signal of low-pass filter 36 is indicative of the development of the average value about which the rotor current signal is oscillating in a substantially sinusoidal manner.

In ripple detector unit 30, a count pulse (ripple pulse) is generated for each detected current ripple. In waviness detector unit 34, a count pulse (waviness pulse) is generated for each period of the rotor current signal. For correct detection of the position of the rotor, it is required that one count pulse per period of the rotor current signal is generated by detector 28. For this reason, the output signals of both detector units 30 and 34 are supplied to a logic OR unit 38 which at its downstream side is connected to an interlocking circuit 40; by means of interlocking circuit 40, it is effected that the next pulse that the logic OR unit 38 will cause in the logic signal will be generated only after lapse of a presettable minimum length of time (e.g. half of the period length of the waviness). Thus, in other words, the interlocking circuit 40 is operative to suppress the forwarding—and the generation, respectively—of a (logic signal) pulse at the output of the interlocking circuit 40 as soon as the logic OR unit 38 has responded, said suppression lasting half a period of the rotor current signal. In this manner, it is safeguarded that, per period of waviness, there will be used either a pulse generated by the ripple detector unit 30 or a pulse generated by the waviness detector unit 34 as a count pulse for detection of the prevailing rotational position of the rotor, thus preventing that the pulses possibly generated by both detector units 30,34 could be evaluated, which would not be correct.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A method for the detection of the rotational position of the rotor of a DC motor with commutator by evaluating the time development of a rotor current signal of the DC motor, said signal comprising a periodic waviness around an average value and comprising current ripples generated by commutation which are superimposed to said waviness, wherein the rotor current signal of a current ripple detector unit (30) is supplied for detecting the current ripples of the rotor current signal, the rotor current signal is further supplied to a waviness detector unit (34) for detecting a half or full wave of the rotor current signal, for each detected current ripple, a current ripple pulse is output by the current ripple detector unit (30), for each period of the waviness, a waviness pulse is output by the waviness detector unit (34), and the output signals of both of said detector units (30,34) are supplied to a logic OR unit (38) for generating a logic signal, within a period of the rotor current signal, a pulse is output by at least one of said detector units (30,34) whereby said logic signal comprises a logic pulse for each period of the rotor current signal.

2. The method of claim 1 wherein, after a logic pulse of the logic signal has been generated, the next logic pulse is generated only when, after lapse of a time duration of half the period of the rotor current signal, at least one of said detector units (30,34) emits a pulse.

3. The method of claim 1 wherein a waviness pulse is generated in the waviness detector unit (34) when it is detected that the present value of the rotor current signal is by a presettable value smaller or larger than the average value of the rotor current signal.

4. The method of claim 1 wherein the average value of the rotor current signal is detected by a low-pass filter (36).

5. The method of claim 1 wherein a ripple pulse is generated in the current ripple detector unit (30) when a presettable minimum rise, optionally with a presettable minimum amplitude, is detected in the rotor current signal.

6. The method of claim 1 wherein the DC motor (10) is driven by a full bridge (12) comprising two high-side transistors (18) and two low-side transistors (20) and wherein the rotor current signal is obtained by measuring the switch-on resistance of the respective low-side transistor (20) which has the rotor current flowing therethrough depending on the rotational direction of the rotor.

7. Use of the method of claim 1 for detecting the position of an element movable by said DC motor on the basis of the rotation of the rotor of the DC motor and the known relationship between the amount of the rotation of the rotor of the DC motor and the amount of the movement of said element.

8. Use of the method of claim 1 for regulating the temperature of interiors of vehicles wherein said DC motor is arranged to drive an actuator for influencing the amount of heat to be supplied into the interior of a vehicle or for influencing the site from which an amount of heat is supplied to said interior, wherein a positional signal indicating the present position of the actuator is detected on the basis of the number of the logic pulses.

* * * * *